(12) United States Patent
Hopkins et al.

(10) Patent No.: US 7,742,566 B2
(45) Date of Patent: Jun. 22, 2010

(54) MULTI-ENERGY IMAGING SYSTEM AND METHOD USING OPTIC DEVICES

(75) Inventors: Forrest Frank Hopkins, Cohoes, NY (US); Susanne Madeline Lee, Cohoes, NY (US); Peter Michael Edic, Albany, NY (US)

(73) Assignee: General Electric Company, Niskayuna, NY (US)

( * ) Notice: Subject to any disclaimer, the term of this patent is extended or adjusted under 35 U.S.C. 154(b) by 64 days.

(21) Appl. No.: 11/952,498

(22) Filed: Dec. 7, 2007

(65) Prior Publication Data

US 2009/0147922 A1    Jun. 11, 2009

(51) Int. Cl.
*G21K 1/06* (2006.01)
*G21K 3/00* (2006.01)

(52) U.S. Cl. .................. 378/84; 378/85; 378/147; 378/156; 378/158; 378/159; 250/505.1

(58) Field of Classification Search .............. 378/84, 378/85, 145, 147, 149, 156, 157, 158, 159; 250/505.1
See application file for complete search history.

(56) References Cited

U.S. PATENT DOCUMENTS

| | | | |
|---|---|---|---|
| 4,684,565 A | | 8/1987 | Abeles et al. |
| 5,175,755 A | * | 12/1992 | Kumakhov ............ 378/34 |
| 5,192,869 A | * | 3/1993 | Kumakhov ............ 250/505.1 |
| 5,195,115 A | * | 3/1993 | Schiller et al. ......... 378/73 |
| 5,216,699 A | * | 6/1993 | Iketaki ................. 378/43 |
| 5,497,008 A | * | 3/1996 | Kumakhov ............ 250/505.1 |
| 5,570,408 A | * | 10/1996 | Gibson ................ 378/145 |
| 5,604,353 A | | 2/1997 | Gibson et al. |
| 5,745,547 A | * | 4/1998 | Xiao ................... 378/145 |
| 5,812,631 A | * | 9/1998 | Yan et al. .............. 378/85 |
| 6,271,534 B1 | * | 8/2001 | Kumakhov ............ 250/505.1 |
| 6,278,764 B1 | * | 8/2001 | Barbee et al. ......... 378/84 |
| 6,317,483 B1 | * | 11/2001 | Chen .................... 378/84 |
| 6,389,100 B1 | * | 5/2002 | Verman et al. ........ 378/84 |
| 6,504,901 B1 | * | 1/2003 | Loxley et al. ......... 378/84 |

(Continued)

FOREIGN PATENT DOCUMENTS

WO    WO0108162 A1    2/2001

OTHER PUBLICATIONS

Tournear et al., "Gamma-Ray Channeling in Layered Structures", IEEE, pp. 4282-4285, 2004.

(Continued)

*Primary Examiner*—Allen C. Ho
(74) *Attorney, Agent, or Firm*—Scott J. Asmus

(57) ABSTRACT

A multi-energy imaging system and method for selectively generating high-energy X-rays and low-energy X-ray beams are described. A pair of optic devices are used, one optic device being formed to emit high X-ray energies and the other optic device being formed to emit low X-ray energies. A selective filtering mechanism is used to filter the high X-ray energies from the low X-ray energies. The optic devices have at least a first solid phase layer having a first index of refraction with a first photon transmission property and a second solid phase layer having a second index of refraction with a second photon transmission property. The first and second layers are conformal to each other.

27 Claims, 11 Drawing Sheets

U.S. PATENT DOCUMENTS

| | | | |
|---|---|---|---|
| 6,678,348 B1 * | 1/2004 | Kumakhov | 378/84 |
| 6,782,073 B2 * | 8/2004 | Collins | 378/65 |
| 6,865,251 B2 * | 3/2005 | Kumakhov | 378/34 |
| 6,934,359 B2 | 8/2005 | Chen et al. | |
| 7,072,439 B2 * | 7/2006 | Radley et al. | 378/47 |
| 7,366,374 B1 | 4/2008 | Lee et al. | |
| 7,412,131 B2 | 8/2008 | Lee et al. | |
| 7,440,546 B2 * | 10/2008 | Liu et al. | 378/85 |
| 7,508,911 B1 | 3/2009 | Lee et al. | |
| 2009/0041198 A1 | 2/2009 | Price et al. | |

OTHER PUBLICATIONS

PCT International Search Report dated Jul. 7, 2009.

* cited by examiner

MULTI-ENERGY IMAGING SYSTEM AND METHOD USING OPTIC DEVICES

BACKGROUND

The invention relates generally to optics, and more particularly to multilayer optic devices and methods for making the same.

Numerous applications exist that require a focused beam of electromagnetic radiation. For example, energy dispersive X-ray diffraction (EDXRD) may be used to inspect checked airline baggage for the detection of explosive threats or other contraband. Such EDXRD systems may suffer from high false positives due to weak diffracted X-ray signals. The weakness of the X-ray signals may stem from a variety of origins. First, the polychromatic X-ray spectrum used in EDXRD is produced by the Bremsstrahlung part of the source spectrum, which is inherently low in intensity. Second, X-ray source collimation may eliminate more than 99.99 percent of the source X-rays incident on the baggage volume under analysis. Third, some of the materials being searched for, e.g., explosives, may not diffract strongly as they are amorphous. Fourth, the diffracting volume may be small. The last two limitations arise from the type of threat materials being searched for in baggage, making all but the second limitation unavoidable. Although discussed in the context of explosives detection, the limitations described above are equally applicable to medical situations.

At lower X-ray energies, such as 80 keV and below, increasing the polychromatic X-ray flux density at the material being inspected has been addressed by coupling hollow glass polycapillary optics to low powered, sealed tube (stationary anode) X-ray sources. An example of hollow glass polycapillary optics may be found in, for example, U.S. Pat. No. 5,192,869. The glass is the low index of refraction material, and air filling the hollow portions is the high index of refraction material. These types of optics typically do not provide much gain at energy levels above 80 keV, since the difference in the indices of refraction between air and glass becomes increasingly small as energy levels approach and surpass 80 keV.

Further, such optics use a concept of total internal reflection to reflect X-rays entering the hollow glass capillaries at appropriate angles back into the hollow capillaries, thereby channeling a solid angle of the source X-rays into collimated or focused beams at the output of the optic. As used herein, the term "collimate" refers to altering the divergence of beams of electromagnetic (EM) radiation from the intrinsically divergent EM beams. Only about five percent of an EM source's solid angle typically is captured by the input of such known optics.

In addition, the use of air in known optics as one of the materials prevents such optics from being placed within a vacuum. Thus, known optics are limited in their potential uses.

The shaping of an X-ray spectrum to optimize it for particular applications is a common procedure. The change in the spectral shape, for example, reducing either the relative proportion of low-energy X-rays or the relative proportion of high-energy X-rays, can in some cases provide for optimum imaging of a sample. One common artifact in radiographic and tomographic imaging arises from the fact that the lower energy X-rays in a typical Bremsstrahlung (polychromatic) spectrum are attenuated preferentially as the beam penetrates material. This effect, which leads to an increase in the mean energy of the beam as it penetrates the sample, introduces a biasing in the relationship between the strength of the transmitted beam and the amount of material penetrated. This biasing manifests as artifacts in any images reconstructed from the attenuation data, such as those attributed to beam hardening in computed tomography. Utilizing an X-ray beam that has a reduced spread of energies can mitigate some of these artifacts. Particularly where beam intensity, with respect to the intensity in that same range of the original spectrum, has been held constant or augmented by the use of the optic, the use of a limited range of energies can provide a desired degree of attenuation for a particular application and can produce an optimum image in terms of spatial resolution and contrast sensitivity. The shaping of a spectrum from a polychromatic energy distribution to a more monochromatic distribution can enable such improvements in X-ray image sets.

Spectral imaging also includes a single energy distribution as well as multi-energy distributions. Multi-energy X-ray imaging, sometimes referred to as dual-energy imaging or energy discrimination imaging, has been shown to furnish information on specific material compositions in scanned objects for security, industrial, and medical applications. Such energy discrimination imaging can be achieved in several ways, including the use of two or more different X-ray spectra, which is often the most feasible approach. A challenge lies in the sequential nature of such an examination, where image data are generated, for example, first with one spectrum and then with another spectrum. In one technique, an object of interest is scanned twice. A first complete projection data set is produced in the first scan for one energy and then a second complete projection data set is produced in the second scan for the second energy. For many applications where high throughput is critical, sample composition is dynamic, and/or sample positioning may preclude repetitive scanning, the logistics of physically scanning an object twice may be unacceptable.

Conventional multi-energy X-ray imaging applications have used source filtration and/or high voltage modulation for rapidly altering the spectral characteristics on a time scale comparable to the view-by-view sampling time in a typical CT scan. Such filtration consists of rapidly and sequentially inserting filters of appropriate composition to preferentially attenuate relatively low X-ray energies. Such methodologies are limited in the degree to which attenuation can produce cleanly separated energy intervals, severely restricting the sensitivity of this approach for analyzing different materials. High voltage modulation to produce different spectral characteristics also has been implemented in some cases with limited success. There is a challenge in both approaches to mitigate registration differences in the image reconstruction projections that result from sample movement between data sets acquired at different energies, as well as a slight misalignment of the X-ray paths that traverse the object, as is incurred with modulating the X-ray beam on a sub-view basis.

BRIEF DESCRIPTION

The invention includes embodiments that relate to an optic assembly that includes an optic device and a filtering mechanism. The optic device transmits a desired range of X-ray energies through at least one of total internal reflection, diffraction, and refraction. The optic device includes at least three conformal solid phase layers, wherein interfaces between the solid phase layers are gapless and wherein the at least three conformal solid phase layers include at least one X-ray redirection region. The filtering mechanism filters out certain energies from a beam transmitted by the optic device.

The filtering mechanism is at least one of a filtering apparatus external to the optic device and a filtering apparatus integral to the optic device.

The invention includes embodiments that relate to an array of optic devices that includes a first optic portion for transmitting high X-ray energies or high and low X-ray energies and a second optic portion for transmitting low X-ray energies.

The invention includes embodiments that relate to a method for forming a high-energy spectrum image by subtracting a low-energy spectrum from a high-and a low-energy spectrum image. The method includes transmitting high and low X-ray energies through an optic device using at least one of total internal reflection, diffraction, and refraction. The method also includes filtering out certain energies from a beam transmitted by the optic device to generate the high-energy spectrum image utilizing a filtering mechanism, wherein the filtering mechanism is at least one of a filtering apparatus external to the optic device and a filtering apparatus integral to the optic device.

The invention includes embodiments that relate to a multi-energy imaging system that includes a source of electrons, a target for forming X-rays upon being struck by electrons from the source of electrons, a vacuum chamber housing the target, and a window through which the X-rays may exit the vacuum chamber. The system also includes at least one optic device configured to transmit a desired range of X-ray energies.

The invention includes embodiments that relate to a method for manufacturing a multi-energy imaging system for filtering low-energy X-rays from high-energy X-rays in an imaging system. The method includes providing a target configured to form X-rays upon being struck with electron beams and providing at least one optic device in optical communication with the target. The at least one optic device is formed to transmit high X-ray energies or to transmit low X-ray energies.

These and other advantages and features will be more readily understood from the following detailed description of preferred embodiments of the invention that is provided in connection with the accompanying drawings.

DETAILED DESCRIPTION

Figure 1:
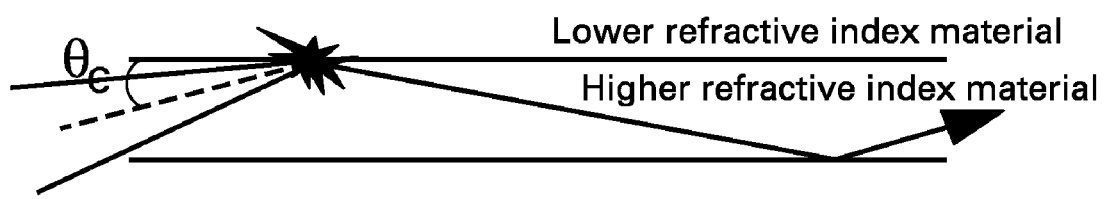
FIG. 1 is a schematic view illustrating the phenomenon of total internal reflection.
Figure 2:
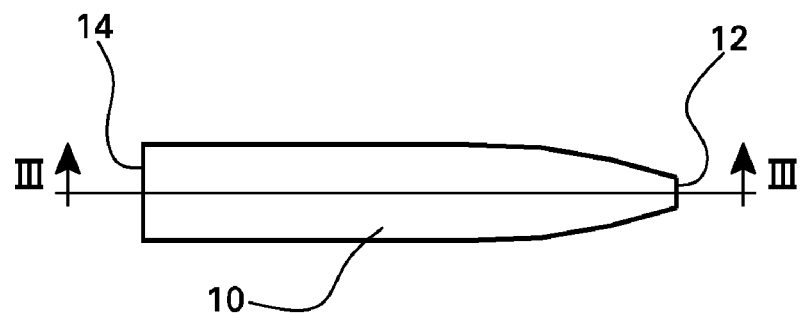
FIG. 2 is a top schematic view of an optic device constructed in accordance with an embodiment of the invention.
Figure 3:
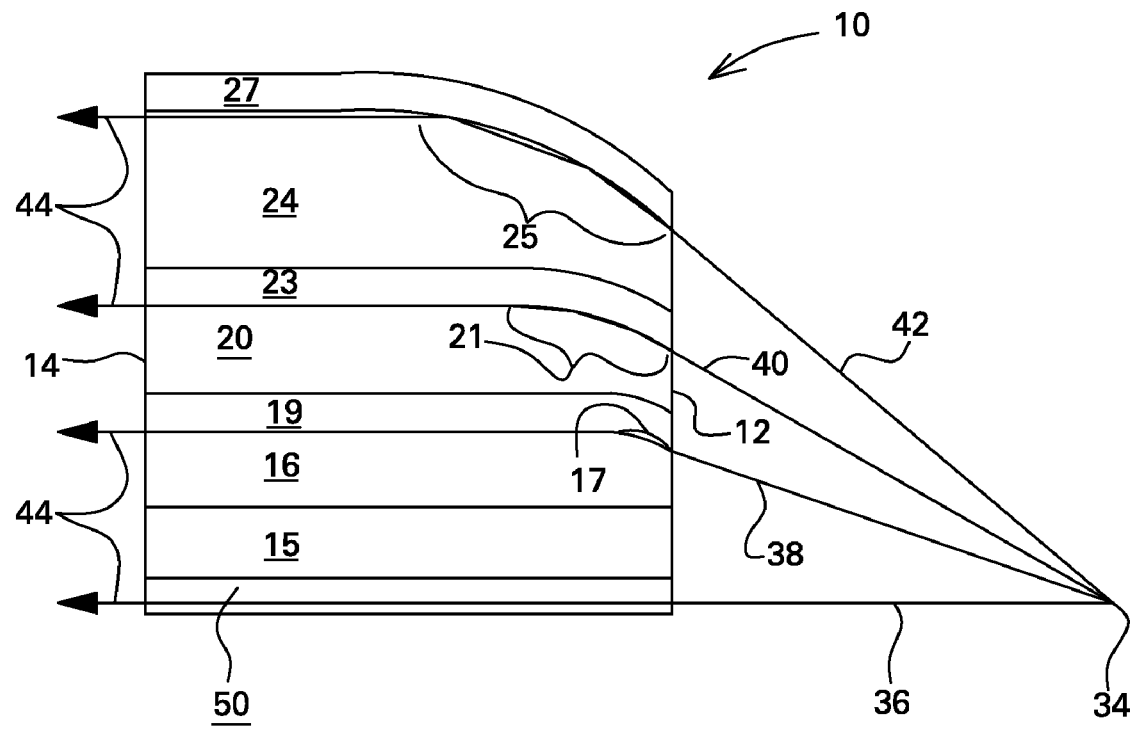
FIG. 3 is a cross-sectional view of the optic device of FIG. 2 taken along line III-III.
Figure 4:
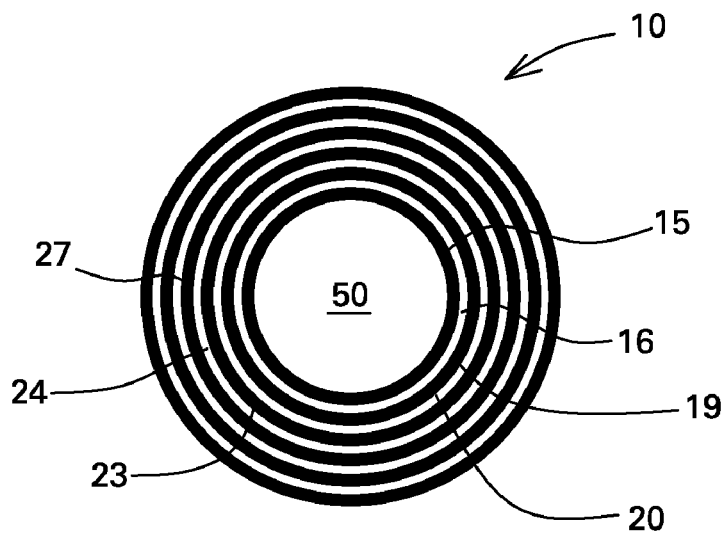
FIG. 4 is an end view of the optic device of FIG. 2.

Embodiments of the invention described herein primarily utilize the phenomenon of total internal reflection. Referring to FIG. 1, when an angle of incidence is less than a critical angle $\theta_c$, total internal reflection occurs. The critical angle $\theta_c$ for total internal reflection depends on, among other factors, the selection of materials, the difference in the relative indices of refraction between the materials, the material photon absorption properties, and the energy of the incident photons. By appropriate material selection in the multilayer optic described herein, the critical angle $\theta_c$ can be increased several times over an air-glass critical angle, allowing many more photons to satisfy the condition for total internal reflection. This will allow a greater photon transmission through a multilayer optic than is possible with, for example, polycapillary optics.

Referring now to FIGS. 2-5, there is shown a multilayer optic 10 including an input face 12 and an output face 14. By "multilayer" is meant a structure that has a plurality of layers with each layer having a single composition. As shown more particularly in FIGS. 3 and 4, the multilayer optic 10 includes multiple layers of material, each having a different index of refraction. For example, there are layers 16, 20, and 24 surrounding a core 50. Layer 15, formed of a lower index of refraction material, is positioned radially exterior to and contiguous with the core 50. The core 50 may be formed of a higher index of refraction material such as beryllium, lithium hydride, magnesium, or any other suitable elements or compounds having similarly higher refractive indices and high X-ray transmission properties. The core 50 may be less than a micrometer to greater than one centimeter in diameter. Layer 20 is positioned radially exterior to layer 16 and radially interior to layer 24.

In one embodiment, the layers making up the multilayer optic 10 may be formed of materials that have varying indices of refraction. For example, layers 15, 19, 23, and 27 may be formed of materials that have a lower index of refraction and a high X-ray absorption. For example, appropriate materials may be chosen from osmium, platinum, gold, or any other suitable elements or compounds having similarly lower refractive indices and high X-ray absorption properties. Further, the core 50 and layers 16, 20, and 24 may be formed of materials having a higher index of refraction and a high X-ray transmission. For example, appropriate materials may be chosen from beryllium, lithium hydride, magnesium, or any other suitable elements or compounds having similarly higher refractive indices and high X-ray transmission properties. The diameter of the core 50 is computed by considering the location of the X-ray radiation source focal point relative to the input face of the optic and the required critical angle for total internal reflection between the higher index of refraction of the core 50 and the lower index of refraction of the layer 15.

By using alternating lower and higher index of refraction materials with concurrent high and low X-ray absorption properties, respectively, in contiguous layers, the multilayer optic 10 can utilize the principle of total internal reflection of electromagnetic radiation. Specifically, diverging electromagnetic radiation beams 38, 40, and 42 stemming from an electromagnetic radiation source 34 enter the input face 12 and are redirected by the principle of total internal reflection into quasi-parallel beams of photons 44 exiting the output face 14.

Multilayer optics in accordance with embodiments of the invention, such as optic 10, can collect a large solid angle of an X-ray source 34 and redirect photons containing polychromatic energies into quasi-parallel photon beams. "Quasi-parallel" means that diverging beams of photons, such as X-rays, have been collected and focused into beams of electromagnetic radiation or X rays to exit the output face 14 at or below the critical angle $\theta_c$. This divergence causes the intrinsic source X-ray beam to be larger than the output face 14 of the optic 10 and larger than the parallel beam of X rays produced by the optic. Alternatively, multilayer optics in accordance with embodiments of the invention may be configured to produce slightly focused, highly focused, slightly diverging, or highly diverging beams. By "slightly focused" is meant that the beam size at the point of interest (i.e., where the diameter of the beam is of concern) is approximately the same as the beam at the output face 14 of the optic 10. By "highly focused" is meant that the beam size at the point of interest is smaller than the beam at the output face 14 of the optic 10. By "slightly diverging" is meant that the beam size is larger than a quasi-parallel beam but smaller than the intrinsic source beam. By "highly diverging" is meant that the beam is the same size or larger than the intrinsic source beam. The phrase "intrinsic source beam" is meant to represent an X-ray beam emitted from the source housing with no optic in the beam.

The composition of materials making up the multilayer optic 10, the macroscopic geometry of the multilayer optic 10, the thickness of the multilayer optic 10, and the number of individual layers determine the angular acceptance range of the multilayer optic 10. The angular acceptance range may be from about 0 steradians up to about $2\pi$ steradians of a solid angle of a photon source. For ease of illustration, only a few layers have been illustrated with reference to multilayer optic 10. However, it should be appreciated that any number of layers, including into the hundreds, thousands, or millions of layers, can be fabricated to utilize total internal reflection to form the various types of photon beams listed previously.

Another feature of the multilayer optic 10 is that the core 50 and the layers 16, 20, 24 may have photon, or X-ray, redirection regions. For example, layer 16 has a photon redirection region 17 stemming from a center of curvature; layer 20 has a photon redirection region 21 stemming from a second center of curvature; and, layer 24 has a photon redirection region 25 stemming from yet another center of curvature. The photon redirection regions 17, 21, 25 are chosen to allow for the diverging electromagnetic radiation beams 38, 40, and 42 to be made parallel or near parallel to beam 36, or conversely to allow for parallel or converging electromagnetic radiation beams to be made diverging. The minimum photon redirection region is determined by the minimum thickness that would still enable a smooth surface, which is at least two atomic layers, or about ten angstroms. The photon redirection regions 17, 21, 25 each contain redirecting segments. The redirecting segments are chosen such that they each have a constant curvature. The curvature of each redirecting segment may be the same as or different from the curvatures of other redirecting segments. If each of the redirecting segments for a particular photon redirection region is straight, then the radius of curvature is infinite.

By curving the multilayers 16, 20, 24 at the input side of the optic 10, the photons or electromagnetic radiation 38, 40, 42 entering the input face 12 can be redirected into quasi-parallel pencil beams 44, thereby increasing the photon flux density at the output face 14 over the photon flux density in the direct source beam (X-ray beam without the optic) at the same distance from the source 34. Depending upon the number of layers in the multilayer optic, there may be a photon density gain for 100 keV photons of as much as 5000 times in the output intensity of electromagnetic radiation from the multilayer optic over the output of conventional pinhole collimators. It should be appreciated that, alternatively, the output face 14 may be formed closer to the input face 12, i.e., positioned prior to the region where the photons are redirected into parallel rays, allowing the input electromagnetic radiation beams 38, 40, 42 to remain somewhat diverging as they exit the output face 14. It should further be appreciated that core 50 and any number of the layers may have no arc of curvature, instead having a cylindrical cross-sectional profile.

An important feature of this optic 10 is that the X-ray transmitting layers, for example, layers 16, 20, 24, can be made thin enough—on the order of a few nanometers—that the solid angle of source photons collected by these layers are small enough to accept almost all the X-rays entering the layers, i.e. the X-ray trajectories satisfy the critical angle condition for total internal reflection. This is unlike known optics, where the X-ray transmitting regions are on the order of microns thick and a significant number are absorbed at the reflecting interface because the photon trajectories do not satisfy the critical angle condition for total internal reflection. In addition, the X-ray absorption layers are orders of magnitude thinner than in known optics making the X-ray transmission of known optics orders of magnitude smaller than the optics described in this application. Furthermore, the overall optic length (from input face 12 to output face 14) is short enough that photon losses are minimal.

Another feature of the multilayer optic 10 is that through fabrication techniques that will be described in detail below, the individual layers can be formed conformally on one another. The conformation of the layers enables the multilayer optic 10 to be utilized in a vacuum environment. Prior art optics utilize air as the higher refractive index material. Such optics cannot be used in vacuum environments. Further, the multilayer optic 10 can be utilized in applications that operate at energy levels above 60 keV, such as, for example, X-ray diffraction, medical and industrial CT imaging, medical and industrial X-ray, and cargo inspection, to name a few. Some of these applications may operate at energy levels as high as 450 keV.

Figure 6:
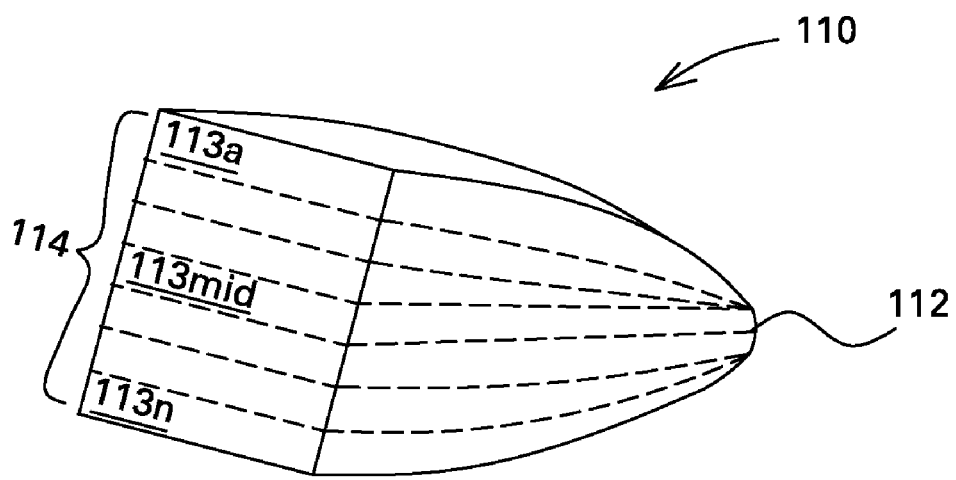
FIG. 6 is a perspective view of an optic device constructed in accordance with an embodiment of the invention.

Referring now to FIG. 6, there is shown a multilayer optic 110 including a plurality of layers 113a-113n, one on top of the other, extending between an input face 112 and an output face 114 having a polygonal profile. As illustrated, the middle layer of the multilayer optic 110 is layer 113mid. Except for layer 113mid, all of the layers include a photon redirection region positioned between the input face 112 and the output face 114. It should be appreciated, however, that layer 113 mid may include a photon redirection region, or that other layers in addition to 113 mid may lack a photon redirection region. The design shown allows diverging electromagnetic radiation to be input into the input face 112, redirected by the optic multilayers, and output from the output face 114 into a reduced cone beam, such as, for example, a reduced cone fan beam. Depending upon where the output face 114 is located relative to the photon redirection regions, the fan beams may be parallel or near parallel or may be somewhat divergent but still focused relative to the input electromagnetic radiation. Additionally, the conformal nature of the individual layers allows for the multilayer optic 110 to be utilized in a vacuum environment.

Figure 7:
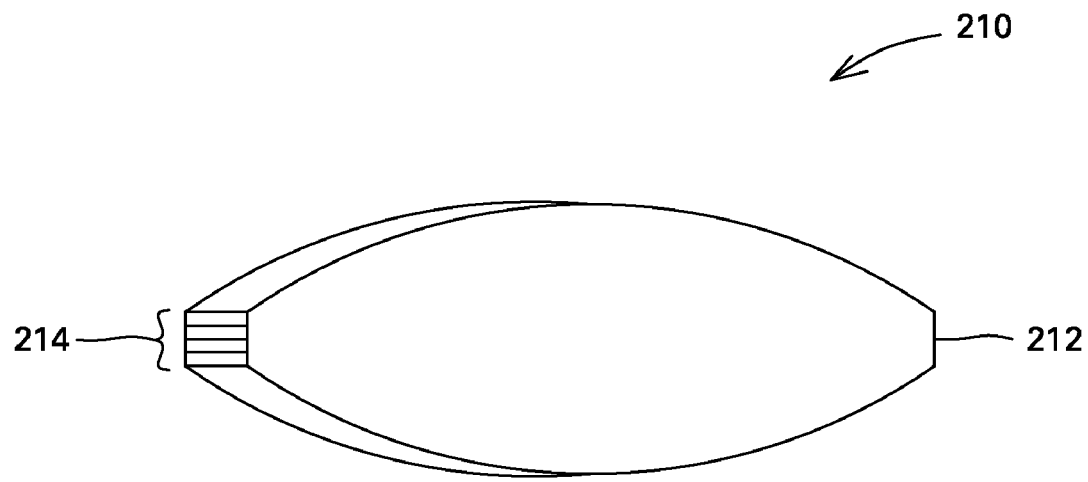
FIG. 7 is a perspective view of an optic device constructed in accordance with an embodiment of the invention.

Referring to FIG. 7, there is shown a multilayer optic 210 that includes an input face 212 and an output face 214. As with the embodiment shown in FIG. 6, the multilayer optic 210 includes individual layers sandwiching a mid-layer. The design shown allows for a focused fan beam output. As with the previously described embodiments, the conformal nature of the individual layers allows the multilayer optic 210 to be used in a vacuum environment.

Figure 8:
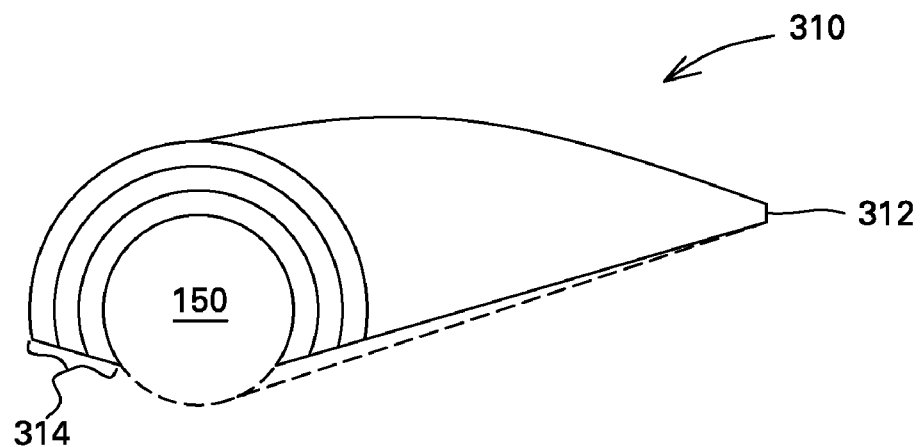
FIG. 8 is a perspective view of an optic device constructed in accordance with an embodiment of the invention.

FIG. 8 illustrates a multilayer optic 310 having an input face 312 and an output face 314. The layers have been positioned over a cone 150, which serves as a blank or mold for the individual layers. Through this design, the output beam exiting the output face 314 is shaped into a curved output, which can be coupled to a singly curved diffracting crystal (not shown) to enable the creation of a cone beam of highly monochromatic radiation. Monochromatic radiation is used in several different applications, including, for example, X-ray diffraction. Highly monochromatic radiation is radiation within a very narrow energy range approximately equal to that produced by diffracting from a single crystal. The curved diffracting crystal can be formed of any suitable material, such as, for example, mica, silicon, germanium, or platinum and curved so that the crystal conforms to the surface of, for example, a cone or cylinder. The suitability of any material for use as the diffracting crystal is dependent upon the diffraction intensity and the lattice spacing of the material. It should be appreciated that the multilayer optic 310 should be positioned between the source of the electromagnetic radiation and the diffracting crystal to obtain the maximum photon flux density in the diffracted beam.

Figure 5:
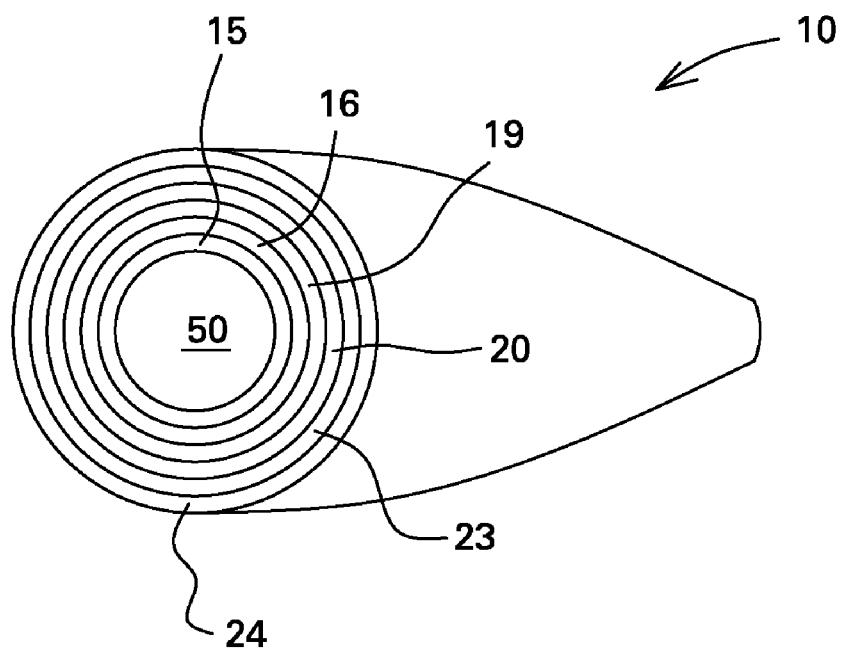
FIG. 5 is a perspective view of the optic device of FIG. 2.

Placing a filter at the input or the output faces of the optics in FIGS. 5-7 will make the optics' output radiation quasi-monochromatic. Quasi-monochromatic radiation is radiation within a limited wavelength range that is greater than the highly monochromatic range but less than the full Bremsstrahlung spectrum from an X-ray source.

Figure 9:
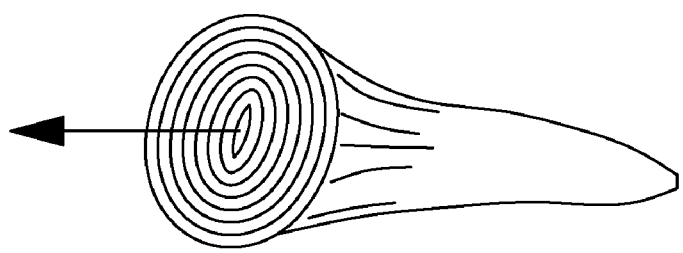
FIG. 9 is a perspective view of an optic device constructed in accordance with an embodiment of the invention.
Figure 10:
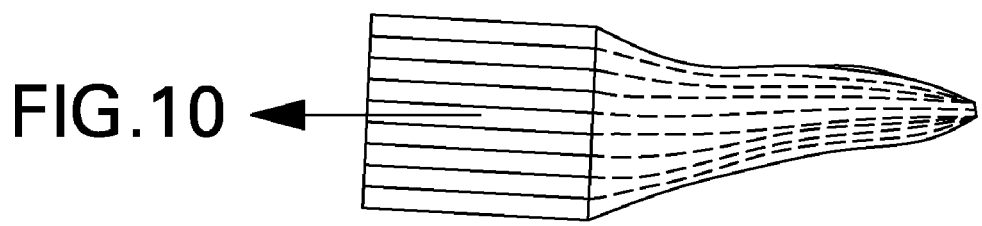
FIG. 10 is a perspective view of an optic device constructed in accordance with an embodiment of the invention.
Figure 11:
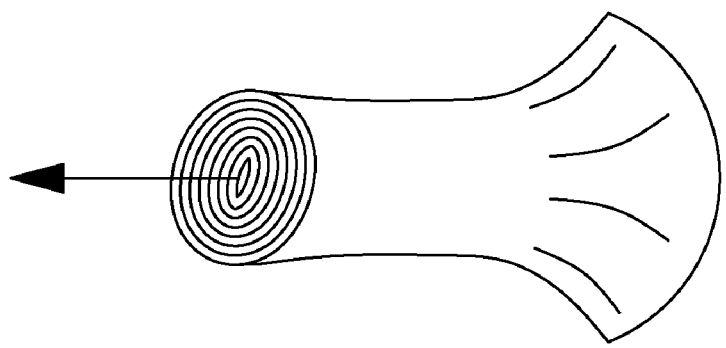
FIG. 11 is a perspective view of an optic device constructed in accordance with an embodiment of the invention.
Figure 12:
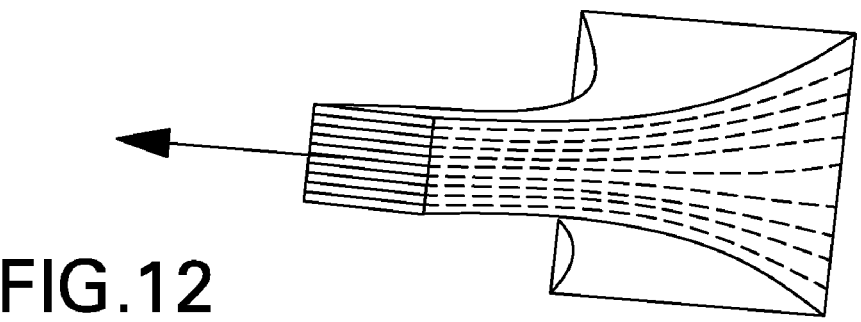
FIG. 12 is a perspective view of an optic device constructed in accordance with an embodiment of the invention.

FIGS. 9-12 illustrate various other potential embodiments of multilayer optics. FIGS. 9 and 10 illustrate multilayer optics that have output faces in a photon redirection region, thereby allowing such optics to emit highly diverging beams. FIGS. 11 and 12 illustrate multilayer optics whose output faces are dimensionally smaller than their respective input faces, allowing such optics to emit highly focused beams.

Figure 13:
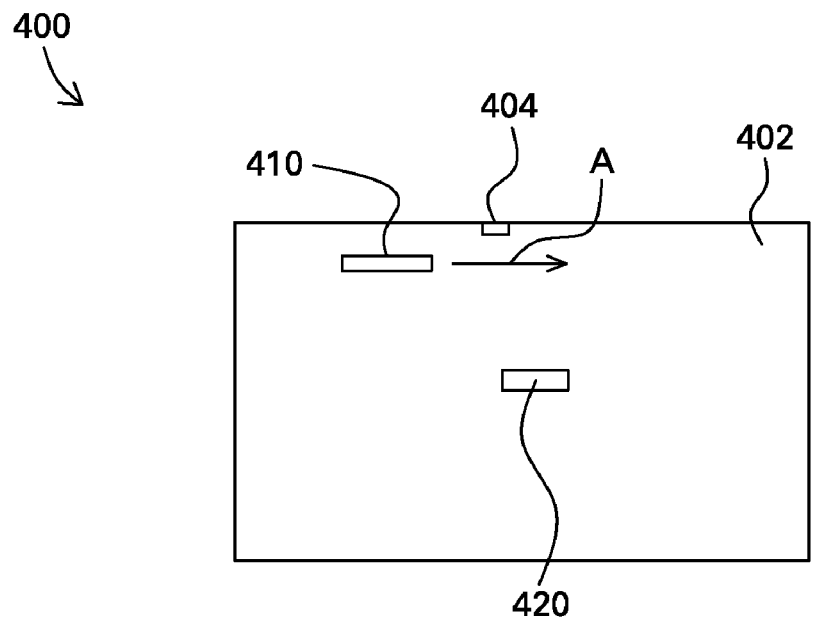
FIG. 13 is a schematic view of a deposition assembly constructed in accordance with an embodiment of the invention.

Referring now to FIG. 13, next will be described an apparatus for use in forming a multilayer optic. Specifically, a multilayer optic deposition assembly 400 is shown including a deposition chamber 402 and a movable shutter apparatus 410. The deposition chamber 402 may be utilized in suitable deposition techniques, including, for example, vapor deposition, or thermal spray deposition. Suitable vapor deposition techniques include sputtering, ion implantation, ion plating, laser deposition, evaporation, and jet vapor deposition. Evaporation techniques may include thermal, electron-beam, or any other suitable technique resulting in appreciable deposition of material. Suitable thermal spray deposition includes combustion, electric arc, and plasma spray. The deposition chamber 402 includes an inputting apparatus 404 for allowing ingress of deposition materials into the deposition chamber 402. It should be appreciated that the inputting apparatus 404 may include numerous inlet nozzles, each being associated with a specific deposition material. A blank 420 is positioned within the deposition chamber 402. The blank 420 may be a core 50 or a cone 150, described previously with regard to the embodiments illustrated in FIGS. 4 and 8, or it may be a substrate serving as a support mechanism for deposited layers. It should be appreciated that the blank 420 can assume virtually any suitable geometric configuration consistent with the desired beam profile. Examples of the almost infinite number of suitable geometric configurations include a circular wafer, a rectangular prism, a cone, a cylinder, and an egg-shape, to name a few.

The shutter apparatus 410 enables the formation of a multilayer optic wherein the individual layers have a photon redirection region. Specifically, as a deposition material is input into the deposition chamber 402 through the inputting apparatus 404, the shutter apparatus 410 moves in a direction A relative to the blank 420. If the speed of the shutter apparatus 410 decreases as it moves in the direction A, an increasing amount of deposition material will contact the blank 420 in the direction A, thereby enabling the formation of a multilayer optic with individual layers having different thicknesses and having photon redirection regions. Control of the movement and velocity of the shutter apparatus 410 may be accomplished electronically with a digital controlling mechanism, such as a microcontroller, microprocessor, or computer. Alternatively, control of the movement may be accomplished manually, or mechanically, such as, pneumatically, hydraulically, or otherwise.

By moving the shutter apparatus 410 along direction A as each deposition material is input through the inputting apparatus 404 into the deposition chamber 402, the individual layers can be deposited upon the blank 420, and a multilayer optic having conformal individual layers, like the multilayer optic 110 shown in FIG. 6, can be formed. In forming a multilayer optic like the multilayer optic 110, the first layer to be laid down may be the layer adjacent to mid-layer 113mid. Then, the subsequent layers leading to and including layer 113a can be deposited. Then, the partially formed multilayer optic can be turned over and the layers leading to and including layer 113n can be deposited. Further, assuming a constant rate of deposition material being injected into the deposition chamber 402, if the shutter apparatus 410 is programmed to begin with a first velocity, transition into a second different velocity, and then transition back to the first velocity, a multilayer optic like the multilayer optic 210 shown in FIG. 7 can be formed. It should be appreciated that the deposition rate of the deposition material in the deposition chamber 402 may be altered as well.

Instead of utilizing a shuttle apparatus 410, it is possible to move at varying speeds the inputting apparatus 404 relative to the blank 420. Further, it is possible to move at varying speeds the blank 420 within the deposition chamber 402 relative to the inputting apparatus 404.

Figure 14:
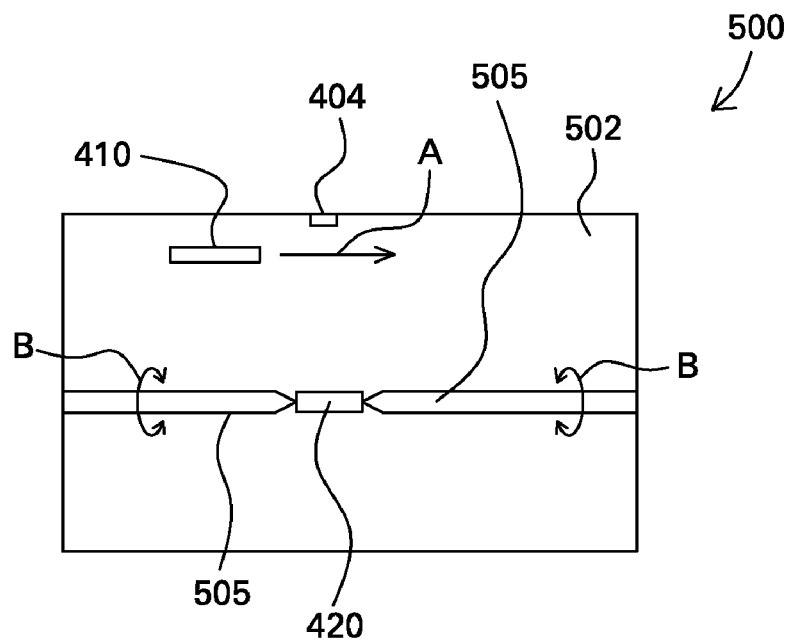
FIG. 14 is a schematic view of a deposition assembly constructed in accordance with an embodiment of the invention.

Referring to FIG. 14, there is shown a multilayer optic deposition assembly 500 that includes a deposition chamber 502 and the movable shutter apparatus 410. The deposition chamber 502 includes the inputting apparatus 404 that is the source of a vapor stream and a pair of rotatable spindles 505. The spindles 505 are capable of rotating in a direction B. Further, the spindles 505 each include a pointed end that comes into contact with and holds the blank 420. By rotating the spindles 505 in the same direction B the blank 420 can be rotated while deposition material is introduced into the deposition chamber 502 though the inputting apparatus 404. Movement of the shutter apparatus 410 in the direction A and rotation of the blank 420 in the direction B will enable the formation of a multilayer optic such as the multilayer optic 10 shown in FIG. 5. Alternatively, the spindles 505 can remain in a non-rotating state during a first set of deposition steps to form the layers adjacent to layers 113mid to 113a in FIG. 6. Then, the spindles 505 can be rotated to turn the partially formed multilayer optic one hundred and eighty degrees around to allow for a second set of deposition steps to form the layers leading to and including 113n to form the multilayer optic 110.

Instead of utilizing a shutter apparatus 410, it is possible to move the inputting apparatus 404 at varying speeds relative to the blank 420 while the blank 420 is being rotated by the spindles 505. Further, it is possible to move the spindles 505 and the blank 420 within the deposition chamber 402 at varying speeds relative to the inputting apparatus 404.

Alternatively, while spinning the blank 420, the inputting apparatus 404 may be kept stationary, with its vapor beams focused to different heights along the blank 420. The resulting different deposition rates will create the depth and laterally graded inputs and outputs on the optic and will enable the formation of a multilayer optic such as the multilayer optic 10 shown in FIG. 5.

Figure 15:
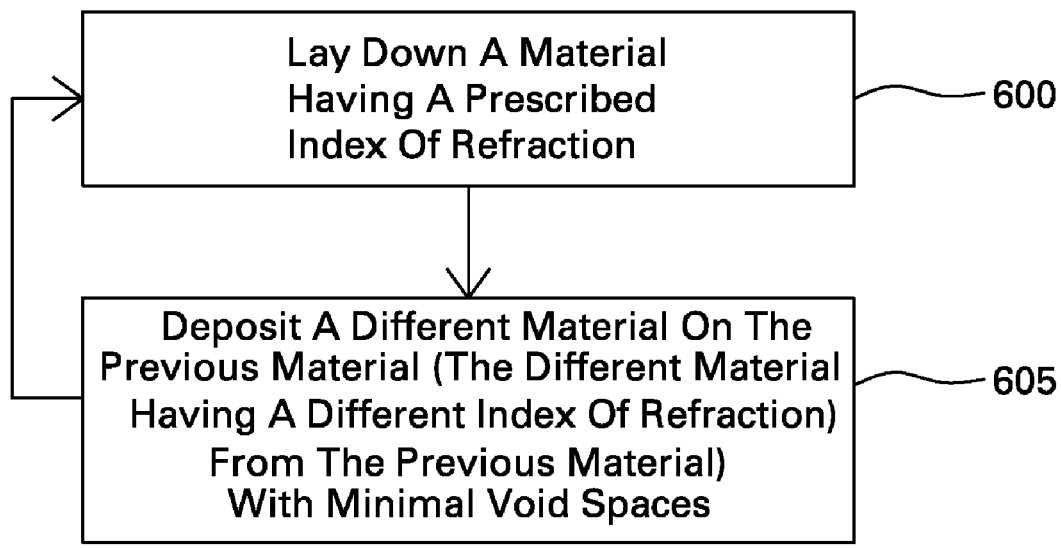
FIG. 15 illustrates process steps for fabricating an optic device in accordance with an embodiment of the invention.

FIG. 15 illustrates process steps for forming a multilayer optic in accordance with an embodiment of the invention. At Step 600, a material having a pre-determined index of refraction with a pre-determined photon transmission coefficient is deposited. The material is deposited on a blank or substrate, which may be a core, a cone, or a polygonal support mechanism. It should be appreciated that the blank or substrate may be incorporated within the multilayer optic, such as the core 50, or may serve merely as a mold, like cone 150. Then, at Step 605, another material having a prescribed index of refraction with a photon transmission coefficient is deposited onto the previous material in such a way as to be conformal and have minimal void spaces. It should be appreciated that each individual layer may be formed at thicknesses in the range of one nanometer to thousands of nanometers. After Step 605, the Steps 600 and 605 can be sequentially repeated to prepare, for example, multiple pairs of layers, with each pair having one layer having a first index of refraction with a first photon transmission coefficient and a second layer having a second index of refraction with a second photon transmission coefficient. The deposition of the first and second materials may be accomplished by any number of suitable processes, such as, for example, vapor deposition, thermal spray deposition, or electroplating. As noted previously, examples of suitable vapor deposition techniques include sputtering, ion implantation, ion plating, laser deposition (using a laser beam to vaporize a material or materials to be deposited), evaporation, or jet vapor deposition (using sound waves to vaporize a material or materials to be deposited). Also, as noted previously, evaporation techniques may be thermal, electron-beam or any other suitable technique that will result in appreciable deposition of material. Examples of suitable thermal spray deposition techniques include combustion, electric arc, and plasma spray.

It should be appreciated that during the deposition process, the partially formed multilayer optic may be rotated, oscillated, or moved. It may be turned, and it may be subjected to a deposition process whereby the deposition material is deposited at different rates along the axis of the multilayer optic. In this way, multilayer optics can be formed with various configurations and profiles that will allow for a greater amount of electromagnetic radiation to be collected from a source at the input of the optic, parallel or near parallel beams of electromagnetic radiation to be output from the multilayer optic, or beams of electromagnetic radiation output from the multilayer optic to be shaped into pencil beams, cone beams, fan beams, or curved in an arc, as an example.

Multilayer optics in accordance with embodiments of the invention may be used in various industrial applications. For example, a multilayer optic formed to emit a quasi-parallel beam having a circular cross-section may find utility in X-ray diffraction and backscatter applications, such as non-destructive examination. A multilayer optic formed to emit a slightly focused beam with a circular cross-section may find utility in X-ray diffraction, X-ray fluorescence, medical diagnostic or interventional treatments, and non-destructive examination applications. Multilayer optics formed to emit a highly focused beam having a circular cross-section may find utility in X-ray fluorescence; medical diagnostic or interventional treatments of, for example, small tumors; and, non-destructive examination applications. Multilayer optics formed to emit a slightly diverging beam having a circular cross-section may find utility in computed tomography and X-ray diagnostic system applications. Multilayer optics formed to emit a highly diverging beam having a circular cross-section may find utility in non-destructive examination applications requiring an increased field-of-view, and in medical diagnostic or interventional imaging and treatments requiring an increased field-of-view, such as the imaging and treatment of large tumors.

One example of the utility of multilayer optics formed to emit a variety of beam shapes is in medical interventional treatments, such as treatment of tumors, where the optic shape is determined by the tumor shape. Such multilayer optics would allow X rays to be focused onto the tumor without irradiating nearby healthy tissue, providing targeted treatment with a minimum of damage to surrounding healthy tissue.

Multilayer optics formed to emit a fan beam in one plane that is quasi-parallel, slightly focusing, highly focusing, slightly diverging, or highly diverging in a direction transverse to the plane may find utility in computed tomography, X-ray diagnostic system, and non-destructive examination applications. The fan beam may have a divergence the same as or greater than that of the source. Alternatively, multilayer optics formed to emit a quasi-parallel fan beam in one plane that is quasi-parallel, slightly focused, highly focused, slightly diverging, or highly diverging within the plane of the fan would produce a beam having a rectangular cross-section that may find utility in computed tomography, as well as non-destructive and medical examination applications.

Multilayer optics formed to emit a fan beam in one plane that is slightly or highly diverging in the direction transverse to the fan beam plane may find utility in medical interventional applications, such as close-up imaging to increase field-of-view. The divergence in the direction transverse to the fan beam plane is equal to or greater than the source divergence. Multilayer optics formed to emit a fan beam in one plane that is quasi-parallel, slightly focusing, highly focusing, slightly diverging, or highly diverging perpendicular to the plane of the fan may find utility in computed tomography, X-ray diagnostic system, and non-destructive examination applications. The fan beam may have a divergence the same as or greater than that of the source.

A multilayer optic coupled to a diffracting crystal may produce a quasi-parallel monochromatic fan beam that may find utility, provided the intensity is great enough, in medical imaging and interventional treatments. Such monochromatic imaging would reduce a patient's dose of X-rays while increasing the resolution, for example, by reducing cone beam artifacts, and reducing streaking/shading such as those incurred with beam hardening effects.

Figure 16:
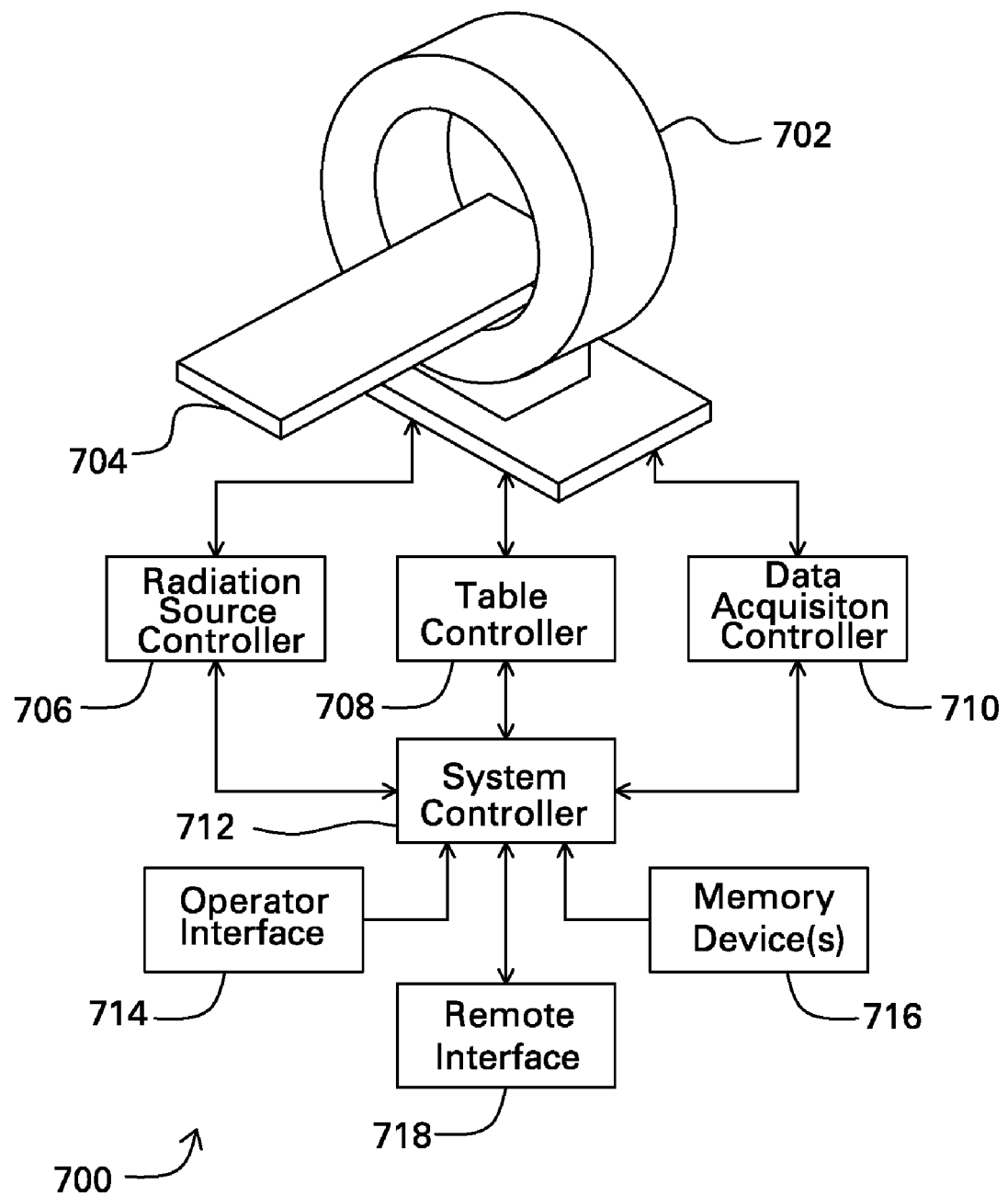
FIG. 16 is a block diagram of a conventional computed tomography system.

FIG. 16 illustrates a conventional acquisition system 700 for use in an object detection system, such as, for example, a computed tomography (CT) scanner. The acquisition system 700 comprises a scanner 702 formed of a support structure and internally containing one or more stationary or rotationally distributed sources of X-ray radiation (not shown in FIG. 16) and one or more stationary or rotational digital detectors (not shown in FIG. 16), as described in greater detail below. The scanner 702 is configured to receive a table 704 or other support for an object to be scanned, such as, for example, baggage or luggage or patients. The table 704 can be moved through an aperture in the scanner to appropriately position the subject in an imaging volume or plane that is scanned during imaging sequences.

The system further includes a radiation source controller 706, a table controller 708 and a data acquisition controller 710, which may all function under the direction of a system controller 712. The radiation source controller 706 regulates timing for discharges of X-ray radiation which is directed from points around the scanner 702 toward a detector element on an opposite side thereof, as discussed below. The radiation source controller 706 may trigger one or more emitters in a distributed X-ray source at each instant in time for creating multiple projections or frames of measured data. In certain arrangements, for example, the X-ray radiation source controller 706 may trigger emission of radiation in sequences to collect adjacent or non-adjacent frames of measured data around the scanner. Many such frames may be collected in an examination sequence, and data acquisition controller 710, coupled to detector elements as described below, receives signals from the detector elements and processes the signals for storage and later image reconstruction. In configurations described below in which one or more sources are rotational, source controller 706 may also direct rotation of a gantry on which the distributed source or sources are mounted. Operation of the gantry also may be controlled by the system controller 712 or a separate controller altogether. Table controller 708, then, serves to appropriately position the table and subject in a plane in which the radiation is emitted, or, in the present context, or generally within a volume to be imaged. The table may be displaced between imaging sequences or during certain imaging sequences, depending upon the imaging protocol employed. Moreover, in configurations described below in which one or more detectors or detector segments are rotational, data acquisition controller 710 may also direct rotation of a gantry on which the detector or detectors are mounted.

System controller 712 generally regulates the operation of the radiation source controller 706, the table controller 708 and the data acquisition controller 710. The system controller 712 may thus cause radiation source controller 706 to trigger emission of X-ray radiation, as well as to coordinate such emissions during imaging sequences defined by the system controller. The system controller may also regulate movement of the table in coordination with such emission to collect measurement data corresponding to volumes of particular interest, or in various modes of imaging, such as helical modes. Moreover, system controller 712 coordinates rotation of a gantry on which the source(s), detector(s), or both are mounted. The system controller 712 also receives data acquired by data acquisition controller 710 and coordinates storage and processing of the data.

It should be borne in mind that the controllers, and indeed various circuitry described herein, may be defined by hardware circuitry, firmware or software. Moreover, the controllers may be separate pieces of hardware, as shown in FIG. 16, or integrated into one piece of hardware. The particular protocols for imaging sequences, for example, will generally be defined by code executed by the system controllers. Moreover, initial processing, conditioning, filtering, and other operations required on the measurement data acquired by the scanner may be performed in one or more of the components depicted in FIG. 16. For example, as described below, detector elements will produce analog signals representative of depletion of a charge in photodiodes positioned at locations corresponding to pixels of the data acquisition detector. Such analog signals are converted to digital signals by electronics within the scanner, and are transmitted to data acquisition controller 710. Partial processing may occur at this point, and the signals are ultimately transmitted to the system controller for further filtering and processing.

System controller 712 is also coupled to an operator interface 714 and to one or more memory devices 716. The operator interface may be integral with the system controller, and will generally include an operator workstation for initiating imaging sequences, controlling such sequences, and manipulating measurement data acquired during imaging sequences. The memory devices 716 may be local to the imaging system, or may be partially or completely remote from the system. Thus, imaging devices 716 may include local, magnetic or optical memory, or local or remote repositories for measured data for reconstruction. Moreover, the memory devices may be configured to receive raw, partially processed or fully processed measurement data for reconstruction. A monitor (not shown) may also be connected to operator interface 714 to allow viewing of scan data, reconstruction data, or otherwise processed data.

System controller 712 or operator interface 714, or any remote systems and workstations, may include software for image processing and reconstruction. As will be appreciated by those skilled in the art, such processing of CT measurement data may be performed by a number of mathematical algorithms and techniques. For example, conventional filtered back-projection techniques may be used to process and reconstruct the data acquired by the imaging system. Other techniques, and techniques used in conjunction with filtered back-projection may also be employed. A remote interface 718 may be included in the system for transmitting data from the imaging system to such remote processing stations or memory devices.

Figure 17:
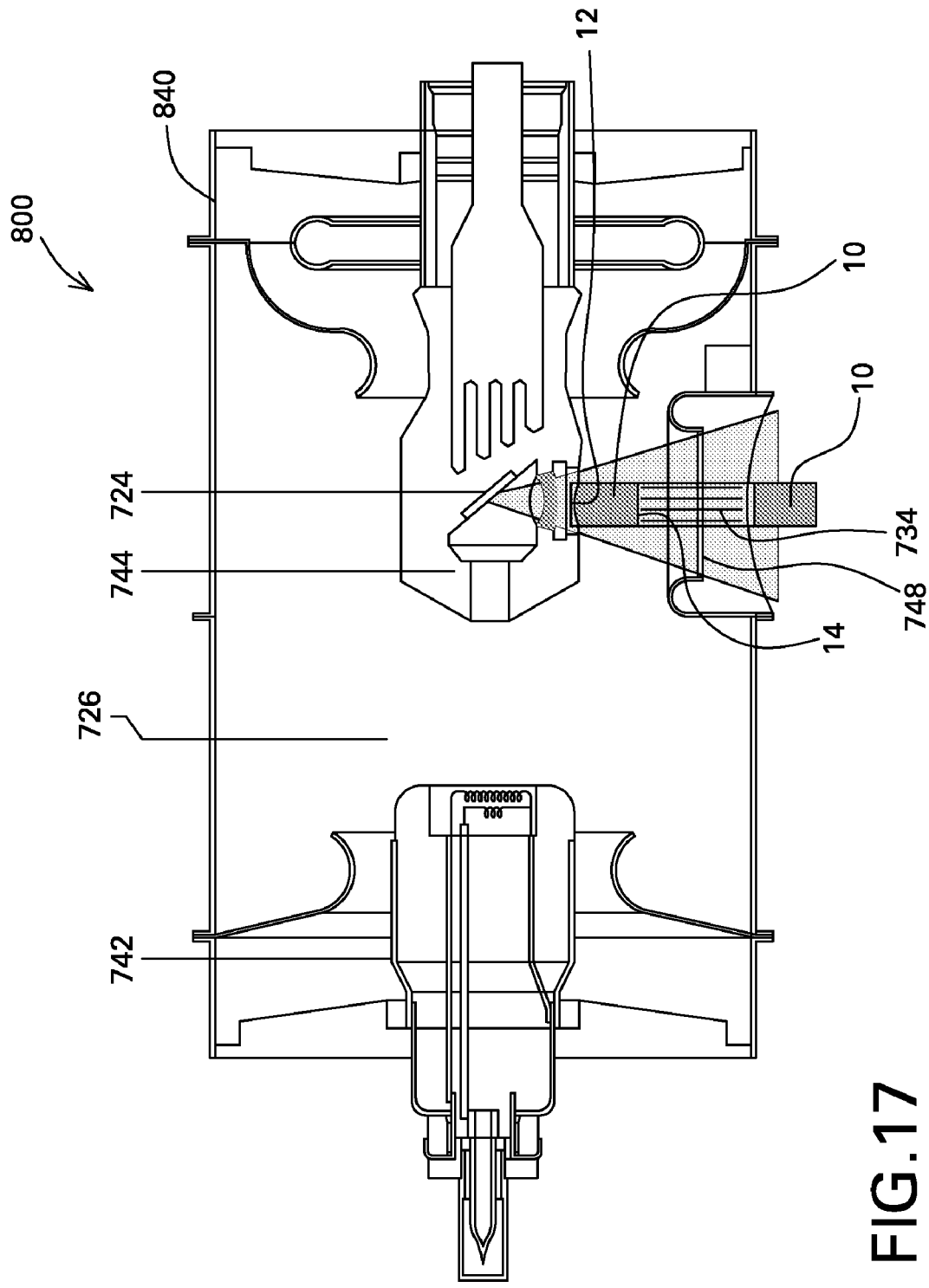
FIG. 17 is a cross-sectional view of an X-ray tube head using an optic in accordance with an embodiment of the invention.

FIG. 17 illustrates a portion of an acquisition subsystem 800 for use in an object detection system, such as, for example, a computed tomography (CT) scanner such as the scanner 702 of FIG. 16. Specifically, FIG. 17 illustrates an X-ray tube head 840. A multilayer optic 10 is incorporated within the system 800. The alternating lower and higher index of refraction materials with concurrent high and low X-ray absorption properties, respectively, in contiguous layers, of a multilayer optic 10 utilize the principle of total internal reflection of electromagnetic radiation. In operation, a filament, such as, for example, a tungsten filament within the cathode 742, is heated to emit an electron beam 726, which is directed towards an anode 744 in which resides the target 724. Thus, diverging X-ray beams emanating from the target 724 enter the input face 12 and are redirected into beams of photons 734 exiting the output face 14. The multilayer optic 10 can be formed to output any desired beam. The multilayer optic 10 can be positioned exterior or interior to the window 748. The multilayer optic 10 is shown in both locations in FIG. 17 for ease of illustration.

The multilayer optic 10 may be formed in such a way as to produce a desired shaped beam of X-rays at energies of 20 keV and above depending on the application, such as the beams of photons 734 shown in FIG. 17. The multilayer optic 10 for producing a limited cone beam of X-rays can be formed as described above with reference to FIGS. 2-5, with the exception being that the output face 14 is formed closer to an input face 12, i.e., positioned prior to the region where the photons are redirected into parallel rays. The input face 12 may be flat or it may be curved to accept as much of the source cone of X-rays from the target 724. This allows the input X-ray beams to be shaped into a desired shaped beam 734.

A third-generation CT imaging system where the X-ray tube and detector rotate about the imaging volume has been described herein; however, the optic is equally applicable to alternate configurations of third-generation technology, for example, with industrial CT configurations where the X-ray source and detector are held fixed and a stage rotates the object during data acquisition.

Figure 18:
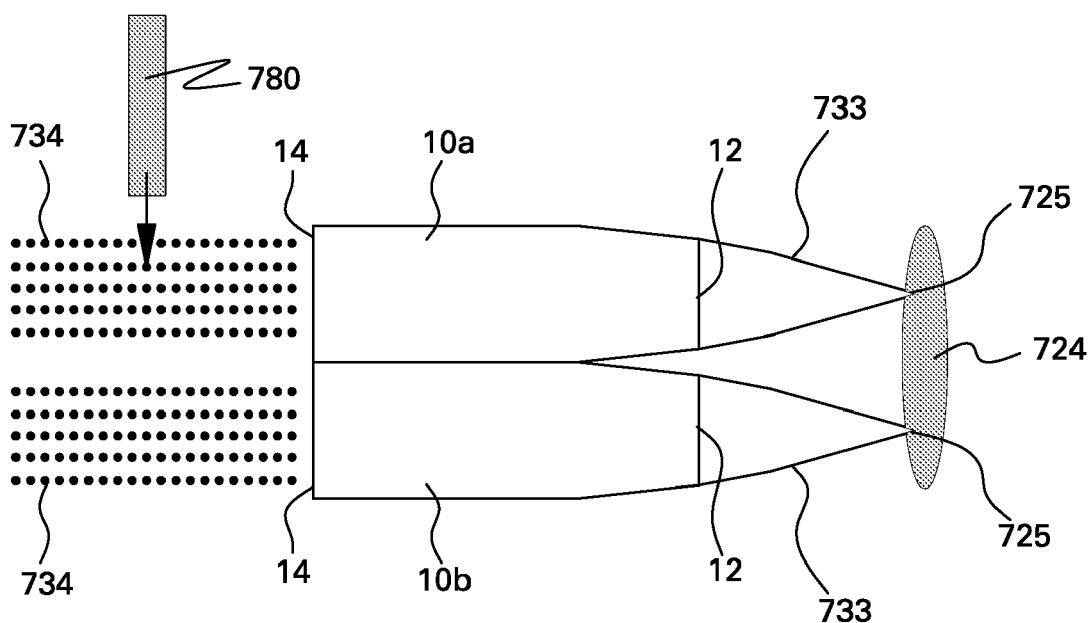
FIG. 18 is a schematic view of a pair of optic devices for use with a target in a dual energy scanning system in accordance with an embodiment of the invention.

Referring specifically to FIG. 18, there is shown a pair of optic devices $10_a$, $10_b$. Each of these optic devices $10_a$, $10_b$ is similar to the optic device 10 described with specific reference to FIGS. 2-5. The difference between the optic devices $10_a$, $10_b$ is that one is formed to pass higher X-ray energies, while the other is formed to pass lower X-ray energies. Shaping or filtering the source spectrum with the optic devices $10_a$, $10_b$ offers the promise of rapidly producing spectral shapes with sharp higher-energy cutoffs on a sub-view basis, which improves material separation sensitivity and can eliminate most registration issues. The capabilities for producing spectra with desired spectral shapes and for producing them on a fast time scale makes such optic devices particularly useful for multi-energy imaging.

K-edge filters may be utilized to provide a sharp low-energy cut-off for each optic $10_a$, $10_b$. One embodiment includes vapor depositing the K-edge filter directly onto either end of the optic $10_a$, $10_b$. Alternatively, the K-edge filter may be formed as a separate foil aligned with the output or input of the optic $10_a$, $10_b$. Then each optic $10_a$, $10_b$ would have its own different K-edge filter either integral to the optic or separate from it.

The optic devices $10_a$, $10_b$, which as illustrated may be in a stacked arrangement, are in optical communication with the target 724 of the X-ray tube head 840 of the acquisition subsystem 800 (FIG. 17). Specifically, X-rays 733 formed by striking electron beams at focal spots 725 on the target 724 are propagated from the focal spots 725 toward the input faces 12 of the optic devices $10_a$, $10_b$. Alternatively, the focal spots 725 may each be within separate individual target spots as opposed to the single continuous target spot 724 or on separate non-contiguous targets. The X-rays 733 are then focused by the optical devices $10_a$, $10_b$, as described above, and exit the output faces as redirected X-rays 734. This geometry can be replicated to produce an array of pairs of such spots, where a distributed array of x-ray source spots is to be utilized.

To assist in separating high- and low-energy signals, a number of options are possible. One such arrangement uses an optic device with a separate K-edge filter to produce two signals whose energy distributions are different from each other. This is done by taking an image with one optic device and then retaking the image with both the optic device and a K-edge filter to eliminate low energy photons. Subtracting the two, appropriately normalized, signals results in a signal with predominantly low energies, while the signal produced by the combined optic device and K-edge filter produces a signal with relatively higher energy photons.

Alternatively, two optic devices could be used in conjunction with at least one K-edge filter. The two optic devices are made of materials that result in x-ray redirection and transmission of two photon energy ranges that may or may not overlap. Taking an image with these two optic devices, repeating with the optic devices and a K-edge filter that blocks the energies from the optic device that transmits the lower energies, and subtracting the two, appropriately normalized, images will result in an image derived from only the low energies passed by the optic that transmitted the lower energies. The lower energy spectrum image could be obtained by subtracting this higher energy spectrum image, appropriately normalized, from the image formed with photons from the combined two optic devices and K-edge filter. To create a sharper low energy cut-off in the lower energy image, a second K-edge filter could be included that blocks the lowest energy photons from that optic.

Another option that can provide even greater energy separation between the signals is to couple the optic devices to separate targets at different accelerating potentials and taking sequential images with x rays emitted by each accelerating potential/optic combination.

To obtain the image sets produced by the different energy distributions quickly and with the best possible statistical definition, a filter wheel 775 (FIG. 19) may be used for sequential filtering of the signals. For example, to generate a dual-energy photon distribution, the filter wheel 775 could be made to include portions 780 that are opaque to all photons and windows 782 that are transparent to all the X rays. The windows 782 are only illustrated partially around the filter wheel 775 for ease of illustration purposes only. Alternatively, the windows 782 could be covered by appropriate filtering material, such as that needed to block the low-energy X rays from the higher-energy spectrum when two optic devices are used for imaging. By rotating the filter wheel 775, a portion 780 can be positioned between the optic device $10_a$ and the detector, thereby blocking all the X rays transmitted by the optic $10_a$ from reaching the detector. Simultaneously, a window 782 can be positioned between the other optic device $10_b$ and the detector, allowing all the X rays transmitted by optic $10_b$ to reach the detector. Then, the filter wheel 775 is rotated to allow a window 782 to be positioned between the optic device $10_a$ and the detector 750, and a portion 780 is positioned between the optic device $10_b$ and the detector 750, allowing X rays from only optic device $10_a$ to be received by the detector.

The optic devices $10_a$, $10_b$ are fabricated such that each filters out certain X-ray energy levels. Specifically, each optic device $10_a$, $10_b$ is fabricated from appropriate optic materials that selectively redirect X-rays of a certain energy level in the optic by predominantly total internal reflection. The refractive indices of the materials used to fabricate the optic devices determine the high-energy cutoff, establishing the emitted spectrum high-energy endpoint.

As described previously, the optic devices include alternating high and low refractive index materials deposited in layers, with individual layers being in the nanometer thickness range. Each layer at the input face 12 of an optic device 10 may be curved to a different degree to capture a large source angle, such as, forty-five degrees or more, and redirect the X-rays into a tightly collimated fan-shaped beam. As described previously, combining some sort of low energy x-ray filtering, such as K-edge filters, with the higher-energy filtration of the optic devices $10_a$, $10_b$, different spectral shapes can be produced effectively. The low energy filtering can take the form of stand-alone foils that can be placed in the conventional post-optic emission position, or between the source focal spot and the optic devices. Alternatively, these low-energy filters can be vapor-deposited or chemically plated onto either the input or output ends of each optic. Another possibility is to incorporate the filter internally to the optic devices as a dopant in the high refractive index materials. Yet another method for filtering the lower energies from an optic's transmission is to manufacture the optic with selectively rough interfaces. The surface roughness will cause the lowest energies to be scattered, while not affecting the reflection of the higher energies. Additionally, a method for internally filtering includes choosing different materials in the optic device that determine the critical angle for total internal reflection, wherein the critical angle determines the highest X-ray energies transmitted by the optic device. The energy spectra produced by these optics-filter alternatives can be shaped considerably different from the source's inherent Bremsstrahlung emission, with much sharper high and low-energy cutoffs.

Figure 20:
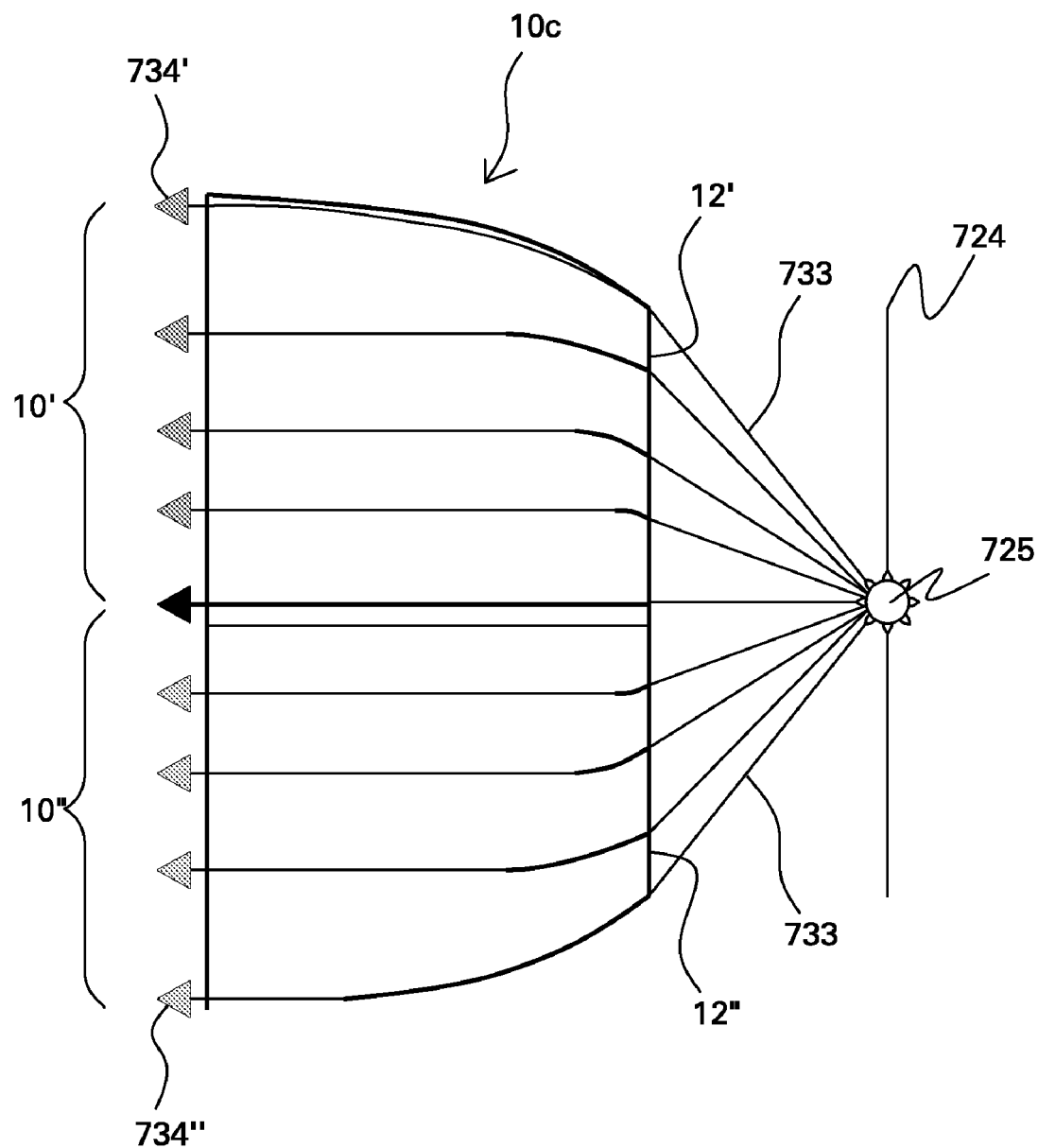
FIG. 20 is a schematic view of a spliced optic device for use with a target in a dual energy scanning system in accordance with an embodiment of the invention.

Another topology for creating two different energy distribution images is shown in FIG. 20 involving splicing together two halves 10', 10" of two different optics to form a single optic device $10_c$. The creation of a single optic device $10_c$ of this type potentially reduces the distance between the centroids of the two target spots 725 and so allows a smaller intrinsic beam spot size to be used, more efficiently utilizing the target emission, reducing target loading, and improving image registration. Switching from one beam to the other could be achieved with a filter wheel such as filter wheel 775.

The difference between the optic devices 10', 10" is that one transmits higher X-ray energies 734', while the other transmits lower X-ray energies 734". Shaping or filtering the source spectrum with the optic devices 10', 10" and appropriately incorporated lower energy filtration of each optic spectrum offers the promise of rapidly producing spectral shapes with sharp high and low energy cutoffs on a sub-view basis, which improves material separation sensitivity and can eliminate most registration issues. The capabilities for producing spectra with desired spectral shapes and on a fast time scale makes such optic devices particularly useful for multi-energy imaging. In the acquisition subsystem 800 (FIG. 17), the optic device $10_c$ is in optical communication with the target 724 of the X-ray tube head 840. Specifically, X rays 733 formed by striking electron beams at focal spot 725 on the target 724 are propagated from the focal spot 725 toward the input faces 12', 12", respectively, of the two halves 10', 10" of the optic device $10_c$. The X rays 733 are then focused by the two halves 10', 10", as described above with regard to the two optic devices $10_a$, $10_b$ (FIG. 18), and exit the output faces as redirected higher and lower energy X-rays 734', 734".

Yet another topology involves even closer spatial integration of the lower and higher energy optic regions. A single optic device can be made with multiple different sets of high and low refractive index materials, allowing one optic to produce multiple energy distributions simultaneously. Additionally, in an optic that produces a dual-energy beam, for example, the portion of the optic device used to produce the lower energy beam could have its corresponding low energy filter (e.g., a K-edge filter) incorporated internally as a dopant. Then the filter wheel would simply contain alternating regions of open windows and the K-edge filters for the optic layer that transmit the higher energy X rays. As described previously, taking sequential images with first the K-edge filter on the filter wheel in line with the optic, then with the open window on the filter wheel in line with the optic, and then subtracting the appropriately normalized images, dual energy images can be created with spatially coincident spots having essentially identical spot shapes (averaged over the nanometer layer structure of the optic).

As noted previously, the K-edge filters may be incorporated as dopants. As an example of how such doping can be accomplished, suppose the K-edge of nickel is used to block the lower energy photons and the high refractive index layers are made of all one material, LiH. Then the LiH layer could be doped with Ni by co-depositing the lithium hydride and nickel simultaneously, with the minimum amount of nickel over the length of the optic needed to block the desired lower energies. The required nickel concentration can be calculated from the overall optic length, the X-ray transmitting layer thickness, and the desired degree of lower energy blocking. For an optic on the order of millimeters long, the number of nickel atoms likely would be three or more orders of magnitude lower than the number of lithium hydride molecules.

Figure 19:
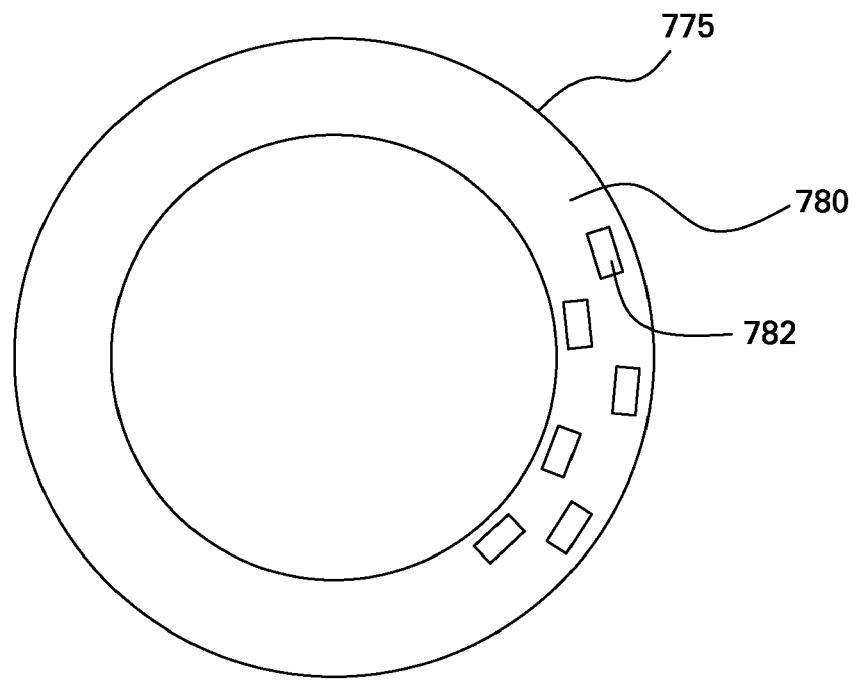
FIG. 19 is a schematic view of a filter wheel for use with the optic devices of FIG. 18.

The dual-energy system described with reference to FIGS. 18-20 will experience fewer registration issues in the image reconstruction projections. By arranging a pair of optic devices $10_a$, $10_b$ together with a rapidly actuated shutter, such as the filter wheel 775, each optic device can be sequentially exposed, thereby controlling which spectrum is emitted at a given time. Such an arrangement can provide alternating spectral shapes on a sub-millisecond timescale, which will mitigate registration differences between the projection sets for the two energies.

In another topology, two optic devices may be used, one being focused onto one X-ray focal spot and shapes the X-ray spectrum in a desired manner, such as producing a lower energy spectrum. The second optic is focused onto a second X-ray focal spot and shapes the X-ray spectrum to produce a higher energy spectrum. Each optic device redirects its output to probe the same volume of space. The range of X-ray energies incident on the optic devices can be rapidly changed by appropriate gridding of either X-ray focal spot, or by redirecting a single beam to multiple X-ray focal spot locations. For example, to probe the scanned object with a low-energy spectrum, the opposite X-ray focal spot is gridded. If the two X-ray focal spot locations utilize the same accelerating potential, the optic devices can be made to filter the spectra as desired. Alternatively, the X-ray focal spot locations may utilize different accelerating potentials and a similar optic device to affect the spectral differences. In yet another embodiment, both accelerating potential and optic device characteristics can be altered to shape the spectral characteristics of the X-ray beam. Furthermore, beam filters can be used with the optic to further shape the spectra as desired. Any of the approaches presented herein may involve replication to provide multi-energy capability for a distributed array of x-ray spots.

Such a multi energy system can be used in applications other than computed tomography. For example, such a system can be used in X-ray diffraction, as well as standard X-ray projection imaging. By using quasi-monochromatic X-rays, the optics can maintain required energy intensity, allowing the scanning speed to remain high.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while the embodiments of the invention described with specific reference to FIGS. 17-20 refer to an optic device 10, $10_a$, $10_b$, $10_c$, such description was for ease of description only and it should be appreciated that any of the multilayer optic devices described herein can be incorporated as appropriate. Furthermore, while single energy and dual-energy techniques are discussed above, the invention encompasses approaches with more than two energies. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An optic assembly, comprising:
   an optic device for transmitting a desired range of X-ray energies though total internal reflection, comprising at least three conformal solid phase layers, wherein interfaces between said solid phase layers are gapless and wherein said at least three conformal solid phase layers include at least one X-ray redirection region; and
   a filtering mechanism for filtering out certain energies from a beam transmitted by said optic device, wherein said filtering mechanism is at least one of a filtering apparatus external to said optic device and a filtering apparatus integral to said optic device.

2. The assembly of claim 1, wherein said filter apparatus comprises at least one roughened interface surface.

3. The assembly of claim 1, wherein said filter apparatus comprises a filter wheel.

4. The assembly of claim 1, wherein said filter apparatus comprises a dopant.

5. The assembly of claim 1, wherein said filter apparatus comprises a vapor deposited or chemically plated material on an input or an output face of said optic device.

6. The assembly of claim 1, wherein said filter apparatus comprises a choice of different materials in said optic device that determine the critical angle for total internal reflection, wherein the critical angle determines the highest X-ray energies transmitted by said optic device.

7. An array of optic devices, comprising:
   a first optic portion for transmitting first optic X-ray energies though total internal reflection; and
   a second optic portion for transmitting second optic X-ray energies, said second optic X-ray energies less than or equal to said first optic X-ray energies,
   wherein either or both of said first and second optic portions comprises at least three conformal solid phase layers, wherein interfaces between said solid phase layers are gapless and wherein said at least three conformal solid phase layers include at least one X-ray redirection region, and wherein at least two of said layers have different indices of refraction.

8. The array of claim 7, wherein said first and second optic portions comprise opposing halves of a single optic device.

9. The array of claim 7, wherein said first optic portion is formed of materials that pass X-ray energies greater than said second optic X-ray energies.

10. A method for forming a limited energy spectrum image by:
    taking an image with x-ray energies transmitted though an optic device using total internal reflection;
    taking a second image with fewer x-ray energies that have been transmitted by the optic device utilizing a filtering mechanism, wherein said filtering mechanism is at least one of a filtering apparatus external to said optic device and a filtering apparatus integral to said optic device, and subtracting the second image from the first image.

11. A multi-energy imaging system, comprising:
    a source of electrons;
    a target for forming X-rays upon being struck by electrons from said source of electrons;
    a vacuum chamber housing the target;
    a window though which the X-rays may exit the vacuum chamber;
    at least one optic device configured to transmit a desired range of X-ray energies, said at least one optic device comprises:
      a first optic portion for redirecting first optic X-rays though total internal reflection; and
      a second optic portion for redirecting second optic X-rays, said second optic X-rays being at a lower energy level than said first optic X-rays; and
      wherein said at least one optic device comprises at least three conformal solid phase layers, wherein interfaces between said solid phase layers are gapless.

12. The multi-energy imaging system of claim 11, wherein:
    said first optic portion is configured for producing a first optic energy spectrum; and
    said second optic portion is configured for producing a second optic energy spectrum, wherein said first optic energy spectrum contains energies less than or equal to the energies in the said second optic energy spectrum.

13. The multi-energy imaging system of claim 11, comprising a filtering mechanism for filtering out certain energies from a beam transmitted by said at least one optic device, wherein said filtering mechanism is at least one of a filtering apparatus external to said optic device and a filtering apparatus integral to said optic device.

14. The multi-energy imaging system of claim 13, wherein said filter apparatus comprises at least one roughened interface surface.

15. The multi-energy imaging system of claim 11, wherein said at least one optic device comprises at least three conformal solid phase layers, wherein interfaces between said solid phase layers are gapless and wherein said at least three conformal solid phase layers include at least one X-ray redirection region.

16. The multi-energy imaging system of claim 15, wherein said filter apparatus comprises a filter wheel.

17. The multi-energy imaging system of claim 15, wherein said filter apparatus comprises a dopant.

18. The multi-energy imaging system of claim 15, wherein said filter apparatus comprises a vapor deposited or chemically plated material on an input or an output face of said optic device.

19. The multi-energy imaging system of claim 15, wherein said filter apparatus comprises a choice of different materials in said optic device that determine the critical angle for total internal reflection, wherein the critical angle determines the highest X-ray energies transmitted by said optic device.

20. The multi-energy imaging system of claim 11, wherein said at least one optic device comprises a pair of optic devices.

21. A method for manufacturing a multi-energy imaging system for filtering different energy level X-rays through total internal reflection in an imaging system, comprising:
    providing a target configured to form X-rays upon being struck with electron beams; and
    providing at least one optic device in optical communication with the target, the at least one optic device being formed to transmit one level of X-ray energies, wherein said at least one optic device comprises at least three conformal solid phase layers, wherein interfaces between said solid phase layers are gapless and wherein said at least three conformal solid phase layers include at least one X-ray redirection region.

22. The method of claim 21, comprising providing a filter for selectively separating the different energy level X-rays.

23. The method of claim 22, wherein said filter comprises at least one roughened interface surface.

24. The method of claim 22, wherein said filter apparatus comprises a filter wheel.

25. The method of claim 22, wherein said filter apparatus comprises a dopant.

26. The method of claim 22, wherein said filter apparatus comprises a vapor deposited or chemically plated material on an input or an output face of said optic device.

27. The method of claim 22, wherein said filter apparatus comprises a choice of different materials in said optic device that determine the critical angle for total internal reflection, wherein the critical angle determines the highest X-ray energies transmitted by said optic device.

* * * * *

UNITED STATES PATENT AND TRADEMARK OFFICE
CERTIFICATE OF CORRECTION

PATENT NO. : 7,742,566 B2  Page 1 of 1
APPLICATION NO. : 11/952498
DATED : June 22, 2010
INVENTOR(S) : Hopkins et al.

It is certified that error appears in the above-identified patent and that said Letters Patent is hereby corrected as shown below:

In the Specification:
In Columns 6 & 7, Line 67 & 1, delete "113 mid" and insert -- 113mid --, therefor.

In Column 7, Line 2, delete "113 mid" and insert -- 113mid --, therefor.

In Column 9, Line 3, delete "though" and insert -- through --, therefor.

In the Claims:
In Column 17, Line 16, in Claim 1, delete "though" and insert -- through --, therefor.

In Column 17, Line 42, in Claim 7, delete "though" and insert -- through --, therefor.

In Column 17, Line 60, in Claim 10, delete "though" and insert -- through --, therefor.

In Column 18, Line 6, in Claim 11, delete "though" and insert -- through --, therefor.

In Column 18, Line 12, in Claim 11, delete "though" and insert -- through --, therefor.

Signed and Sealed this

Seventeenth Day of August, 2010

David J. Kappos
*Director of the United States Patent and Trademark Office*